April 28, 1925.
N. P. BACH
1,535,197
CONTINUOUS COOKER
Filed Feb. 28, 1921
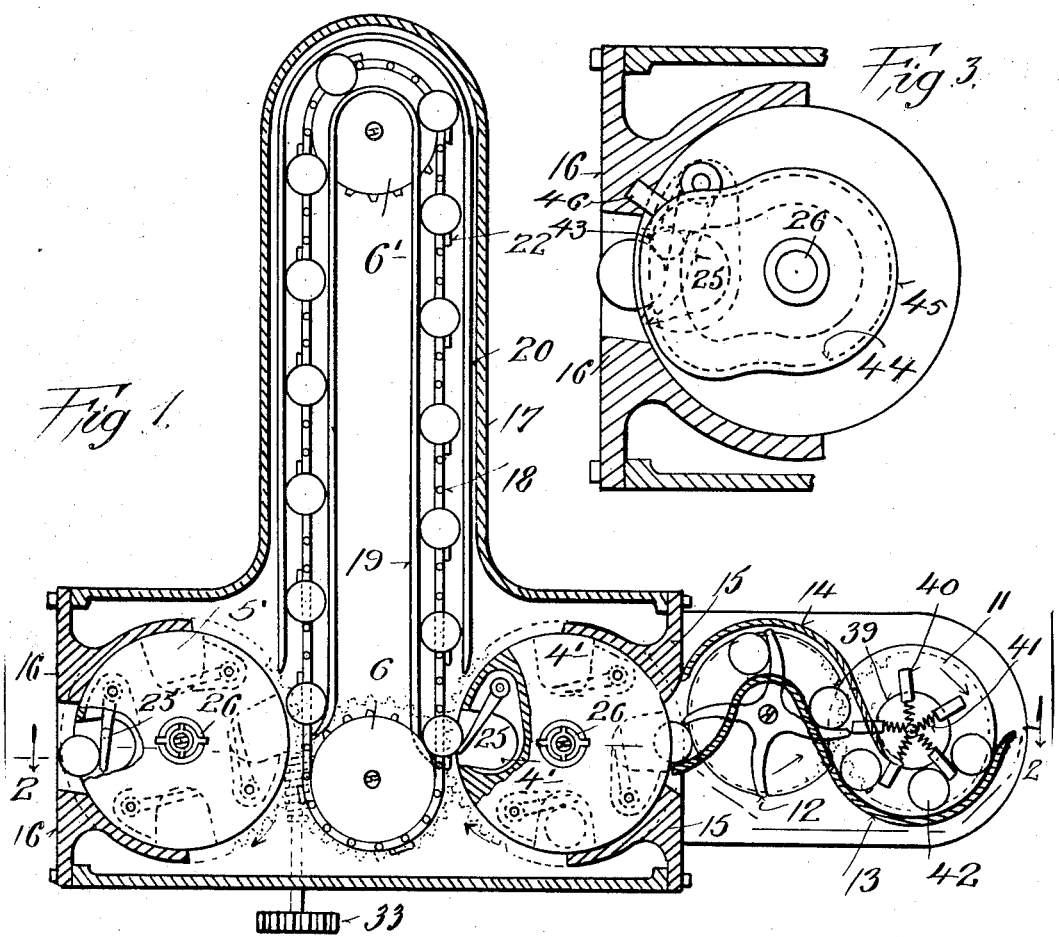
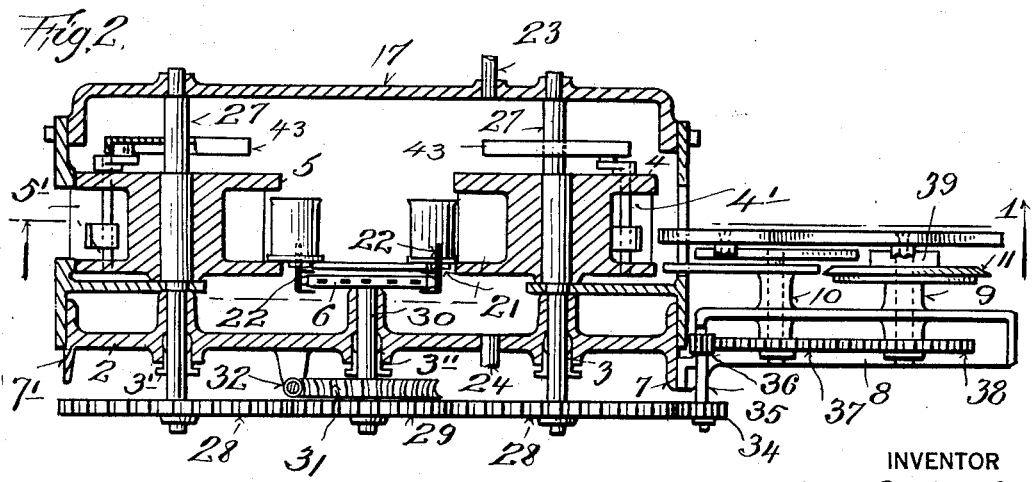
INVENTOR
Niels P. Bach
BY his ATTORNEYS
Darby & Darby Patented Apr. 28, 1925.

1,535,197

UNITED STATES PATENT OFFICE.

NEILS P. BACH, OF MILLBURN, NEW JERSEY, ASSIGNOR, BY MESNE ASSIGNMENTS, TO THERMOKEPT CORPORATION, A CORPORATION OF DELAWARE.

CONTINUOUS COOKER.

Application filed February 28, 1921. Serial No. 448,479.

*To all whom it may concern:*

Be it known that I, NEILS P. BACH, a subject of the King of Denmark, residing at Millburn, in the county of Essex and State of New Jersey, have made a certain new and useful Invention in Continuous Cookers, of which the following is a specification.

My invention relates to improvements in cookers whereby it is possible to successively and continuously feed into a processing or cooking chamber, the cans or containers having therein products to be processed or cooked, and, after having been subjected to a suitable processing or cooking, to continuously remove the succession of cans or containers without interrupting the processing or cooking pressures and temperatures.

Another object of my invention includes the provision of co-acting conveying mechanism whereby it is possible to pass a constant stream of cans or containers through a processing or cooking chamber.

A further object of my invention includes the provision of a feed or inlet valve for continuously admitting cans, or containers, into the processing or cooking chamber, and in co-operation therewith provide a similar outlet valve for continuously passing the processed cans out of said chamber without interrupting the cooking or processing temperature or pressures within the chamber.

A still further object of my invention includes the arrangement and provision for seating said inlet and outlet valves by the inequality of pressures within and without said chamber.

Other objects will become apparent hereinafter from the description and claims.

I attain these objects by the mechanism illustrated in the accompanying drawing, in which, Fig. 1 is a plan view partly in section taken on line 1—1 of Fig. 2;

Fig. 2 is a section on line 2—2 of Fig. 1; and

Fig. 3 is a top plan view partly in section showing the upper part of the valve cylinder and the finger moving mechanism.

Referring now to the drawings in which similar numerals refer to like parts throughout the several views, a frame or support 2 for supporting the operative parts may be provided, preferably of a suitable metal. In this frame are provided proper bearings 3, 3' and 3" for supporting the inlet valve 4, the outlet valve 5 and the sprocket wheel 6, respectively. Attached laterally to this frame at 7, by any suitable means, there is provided a support 8 having bearings 9 and 10 for supporting a feed disk 11 and a feed star 12, respectively. On this lateral support there is also attached a guide flange 13 of a compound curve and a smaller flange 14 for the purpose hereinafter more fully set forth. This lateral support with its co-operating mechanism constitutes the feed device for advancing cans or containers and delivering them into the inlet or feed valve. A similar receiving device is provided laterally of the frame at 7', but which is not herein shown.

Immediately above the lateral supports are the valve seats 15 and 16 for the valves 4 and 5, and which seats form a part of the cooking or processing chamber. The remaining portion of the cooking or processing chamber is formed by a casing 17 and the walls of the main supporting frame. For convenience, I have shown the casing 17 as forming a simple elongated chamber in which there is provided an endless conveyor chain 18 or the like, carried on a drive sprocket 6 at one end and an idler sprocket 6' at the other.

Associated with the chain and sprocket wheels are an inner guide strip 19 and an outer guide strip 20 between which the cans or containers are caused to pass over a table 21 and moved by fingers 22, which fingers are attached to the chain. A steam supply pipe 23 may be provided for supplying the heating medium. A drain 24 for carrying off the products of condensation may be provided as shown, or at any other suitable point.

The inlet and outlet valves consist essentially of cylindrical valve blocks 4 and 5, having pockets 4' and 5', in which are discharge or ejection fingers 25. As appears from an inspection of the drawing, these valve blocks are mounted on a floating bearing 26, and operate to permit the valve blocks to be positively seated in the valve seats 15 and 16 when, for example, the internal pressure exceeds atmospheric or external pressure for the purpose set forth below. The valve blocks and bearings are carried on journals 27, to which are attached gears 28, which mesh with a gear 29, on the end of the drive sprocket journal 30. Integrally connected to the sprocket journal 30 is a drive gear 31, which meshes with a worm gear 32 for operating the mechanism through a suitable drive gear 33 or other means, as a pulley, electric motor, or the like. For properly advancing the cans or containers to the feed valve, the feed mechanism is operated through a drive gear 34, which meshes with the feed valve gear 28, and is carried on a shaft 35. The shaft 35 has attached thereto at its upper end a drive pinion 36 for engaging and driving the feed star gear 37. Gear 37 meshes with a drive gear 38 for operating the feed disk 11. Above the feed disk 11 there is provided a hub or projection 39, which movably supports a suitable number of can spacing plugs 40. These plugs are resiliently mounted on springs 41, and operate to feed the cans or containers 42 when the mechanism is operated.

The ejection fingers 25 may be operated by any suitable means as by cam rollers 43 operating in a raceway 44 of the cam plate 45, which plate may be held in position by bracket 46.

The operation is as follows:

When a supply of steam or other heating medium is admitted to the cooking or processing chamber by any suitable means, as through supply pipe 23, until the desired pressure has been attained, it is obvious that, due to the construction and mounting of the valves, the valve blocks 4 and 5 will be firmly seated in the valve seats 15 and 16, so that no heating medium readily escapes. If now the machine is put into operation through drive gear 33, or other means, the intermeshing train of drive gears will synchronously operate the valves as well as the several feed, conveyor and ejection devices, so that there will be a continuous stream of cans, or containers, fed into the cooker chamber to be conveyed therethrough and as continuously discharged through the exit or ejecting valve. Obviously by varying the pressure and varying the temperature, the degree of cooking or processing may be regulated. It may also be regulated by varying the lengthening of the path of travel or by varying the rate of travel through the apparatus.

While I have described a specific embodiment of my invention, I do not thereby desire to limit myself, as obviously various modifications will present themselves to those versed in the art coming within the scope and spirit of my invention.

What I claim, therefore, as new and useful and of my own invention, and desire to secure by Letters Patent, is:

1. In a continuous cooker mechanism, the combination of a cooker chamber, means including a pressure sealed valve for feeding a continuous stream of containers into said chamber, means for advancing said containers through said chamber, and means for continuously removing said containers from said chamber while maintaining a cooking pressure within said chamber.

2. In a continuous cooker mechanism, an elongated cooker chamber having an enlarged head, a pair of pressure seated valves in said head, one of said valves feeding a continuous stream of containers into said chamber, and the other of said valves continuously ejecting said containers from said chamber while maintaining constant cooking pressure.

3. A continuous cooking apparatus comprising an elongated cooker chamber having an enlarged head, valve seats in said head, valves in said seats, one of said valves and seats constructed to pass an uninterrupted stream of containers into said chamber, and the other of said seats and valves constantly ejecting said containers while maintaining the cooking pressure constant, said valves being pressure seated.

4. A continuous cooking apparatus comprising an elongated cooker chamber having an enlarged head, valve seats in said head, valves in said seats, said valves having a plurality of pockets and being seated in said seats by pressure, a conveyor mechanism doubling upon itself and extending into said elongated chamber from said valves for carrying containers from one of said valves to the other of said valves in an uninterrupted and continuous stream.

5. In a cooker device, the combination of an elongated chamber and valve seats forming an enlarged head for said chamber, pressure-seated valves in said seats, spacer devices for feeding containers to one of said valves, a conveyor extending from said head into said chamber for receiving an uninterrupted flow of containers, and conveying the same through said chamber for continuously discharging said containers.

6. The combination in a continuous pressure cooker mechanism of a processing chamber having a port therein and a valve controlling said port for conveying a continuous stream of containers therethrough under cooking pressure, said valve being seated by said pressure.

In testimony whereof I have hereunto set my hand on this 28" day of January, A. D. 1921.

NEILS P. BACH.